United States Patent [19]

Richmond

[11] Patent Number: 5,315,954
[45] Date of Patent: May 31, 1994

[54] HOT BEARING ALARM

[75] Inventor: Allan Richmond, Newcastle upon Tyne, United Kingdom

[73] Assignee: Huwood Limited, United Kingdom

[21] Appl. No.: 802,505

[22] Filed: Dec. 5, 1991

[30] Foreign Application Priority Data

Dec. 12, 1990 [GB] United Kingdom ............ 9027013
Nov. 11, 1991 [GB] United Kingdom ............ 9123936

[51] Int. Cl.$^5$ .................. F16C 17/24; G01K 1/02
[52] U.S. Cl. .................... 116/67 R; 116/218; 246/169 A; 384/448
[58] Field of Search ............ 116/218, 217, 67 R; 246/169 A, DIG. 2; 384/448

[56] References Cited

U.S. PATENT DOCUMENTS

| 1,270,954 | 7/1918 | Jordan et al. | 246/169 A |
| 1,919,693 | 7/1933 | Faus | 246/169 A |
| 2,203,414 | 6/1940 | Knaack | 246/169 A |
| 2,952,238 | 9/1960 | Barber | 246/169 A X |
| 3,401,666 | 9/1968 | Munroe | 246/169 A X |
| 4,148,271 | 4/1979 | Majernik | 116/67 R |
| 4,325,217 | 4/1982 | Golestaneh | 116/218 X |
| 4,812,826 | 3/1989 | Kaufman | 246/169 A X |

FOREIGN PATENT DOCUMENTS 1693284 11/1993 U.S.S.R. ............ 384/448

Primary Examiner—Daniel M. Yasich
Attorney, Agent, or Firm—Krass & Young

[57] ABSTRACT

The present invention relates to an alarm system suitable for use in warning of overheating in rotatable bearings 4 having first and second bearing portions. The alarm system comprises an alarm signal generator means having a thermally activated engagement element 8 on a first bearing portion or body 6 connected thereto. The element 8 is in thermal connection with the bearing 4 and is formed and arranged so as to be driven from a first primed retracted position into a second deployed extended alarm position upon reaching a predetermined temperature. In the alarm position the element 8 contacts an engaging portion 12 on the second bearing portion so as to produce a distinctive alarm signal indicating that said bearing 4 has exceeded the predetermined temperature.

26 Claims, 3 Drawing Sheets

HOT BEARING ALARM

The present invention relates to an alarm system suitable for use with rollers and other rotary mechanisms having relatively rotatable parts with a bearing therebetween.

The invention relates particularly to a device which gives an indication that a bearing is overheating and thereby gives an early indication of possible bearing failure. When a bearing is contaminated by dirt or moisture and/or is rotated with insufficient lubricant or an excess of lubricant and/or is overloaded, the bearing temperature generally increases progressively until eventually it is well above the normal working temperature of the bearing. Such increases in temperature are generally a symptom of impending bearing collapse or seizure which may cause damage to other components in a machine. Furthermore as a bearing overheats it may reach a temperature whereby it ignites surrounding material and it is therefore highly desirable to obtain early warning of such problems.

Conventional monitoring of rollers bearings by maintenance personnel or by instrumentation has generally been found to be either impractical or prohibitively expensive.

It has previously been proposed (GB-A-2 155 678) to utilize a thermal release device which trips when the temperature exceeds a control temperature, and whose position is remotely sensed by a sensing means which transmits a sign(il to a central monitoring unit. In this case though the thermal release device is mounted radially of the bearing. This presents considerable practical difficulties in relation to installation in many situations such as in conveyor rollers and further substantial difficulties in relation to monitoring of the tripping of the device since the annular zone around the bearing and thermal release device is often obstructed in one way or another in such situations e.g. by the outer roller casing, conveyor belt supported thereby, bulk material carried on the belt etc. Also the deliberate use of remote sensing of the change in position of the thermal release device significantly increases the complexity and thereby also the unreliability of the system.

It is an object of the present invention to avoid or minimise one or more of the above disadvantages.

The present invention provides an alarm system suitable for use in warning of overheating in rotatable bearings comprising first and second bearing portions, said alarm system comprising an alarm signal generator means having a thermally activated engagement element provided on at least one of a first bearing portion and body connected thereto so as to be in thermal connection with said bearing portion and formed and arranged so as to be driven upon reaching a predetermined elevated temperature from a first primed retracted position into a second deployed extended alarm position for producing a distinctive signal wherein at least one of said second bearing portion and a body connected thereto is provided with an engaging portion, and said engagement element is formed and arranged so that, in its deployed extended alarm position, it makes at least intermittent contact with said engaging portion during relative rotation between said first and second bearing portions without substantially preventing continuing relative rotation of said bearing portions, and is formed and arranged so as to produce from its contact with said engaging portion a said distinctive alarm signal, indicating that said bearing has exceeded said predetermined temperature.

It will be appreciated that various forms of alarm signal generator means may be used in accordance with the present invention. Thus there may be used a signal generator means having an engaging portion in the form of one or more generally radially extending projections on said second bearing portion or body connected thereto which is (are) periodically struck by the deployed engagement element as the bearing portions rotate relative to one another, so as to produce a form of more or less audible "clicking" sound, at least one of the engagement element and the projection(s) preferably being resiliently deflectable so as to permit continued alarm signal generation over an extended period of time without damage to the parts. The "clicking" sound could moreover be a more or less loud acoustic signal which could be directly auditorily sensible or via suitable audio transmission, amplification and/or relay means. Alternatively there could be utilised a "clicking" detectable by piezo-electric transducer means or other suitable apparatus for detecting non-audible form alarm signals.

In yet another alternative there could be used an engaging portion in the form of an at least partially circumferentially extending surface which upon frictional contact with the engagement element provides a distinctive screeching or like sound.

Thus with an alarm system of the present invention an alarm signal is given upon overheating of a bearing in use of the system so that said overheating bearing may be readily detected and replaced thereby minimising the risk of fire etc. from continued overheating.

One especially useful application of the present invention is to the rollers of belt conveyors, including both idler and driving rollers, particularly for use in potentially hazardous environs such as underground coal mines and the like. The alarm system of the present invention has many other applications, though, in rotary bearings in machinery used in the petrochemical industry, automobiles, elevators, lifts, machine tools, strips, docks, sugar and grain processing, manufacturing, printing, the gas industry etc.

It will be appreciated that various forms and methods of activating and driving said thermally activated engagement element may be employed. Thus for example a bimetallic strip, a bimetallic spring or other combinations of at least two elements of materials having different coefficients of expansion may be used as well as a memory metal, a memory strip or spring or other material having shape memory characteristics, may be used wherein the activation and the driving of said engagement element are integrated into a single component. In another form, the activation and the driving functions of said engagement element may be performed by separate means, for example the driving of the engagement element may be by a pre-stressed resilient biasing means e.g. an helical coil spring, which is retained in place by a low melting point alloy plug, wherein the melting point of said alloy plug corresponds to said predetermined elevated temperature, so that when said plug melts it releases the resilient biasing means so as to drive said engagement member into a deployed alarm position.

The engagement element thermal activation means may be formed and arranged for activation at any suitable temperature, conveniently a temperature in the range from 60° to 110° C., For example at a temperature of about 70° C.

Preferably said distinctive alarm signal is an acoustic signal which may be readily detected by signal monitoring equipment for activation of (conveniently remotely situated) suitable alarm means such as warning bells, sirens, klaxons etc. and/or warning lights such as flashing lamps, l.e.d.s etc.

In general though alarm systems of the invention with direct acoustic alarm signal generation are preferred since these are on the one hand of simpler and more economical construction, and on the other hand are more reliable in operation and facilitate more or less ready localisation of an individual overheating bearing from amongst a group, without the need for extensive communication links to a central control system.

In a particularly preferred aspect of the invention the engagement element is mounted for displacement between its retracted and extended positions, generally axially of the rotatable bearing.

Preferably at least one of said engagement element and engaging portion has an acoustic element formed and arranged at a substantially external portion of the bearing portions and any said bodies connected thereto so as to transmit to the exterior of said bearing portions and any bodies connected thereto, upon contacting of the engaging portion by the engagement element, a substantial acoustic distinctive alarm signal.

Thus the engagement element is mounted for displacement between its retracted and extended positions in a direction which is generally parallel to the rotational axis of the bearing, conveniently more or less substantially offset from said rotational axis.

As used herein the expression "acoustic element" indicates any element which upon contacting of the engaging portion by the engagement element is conducive to a greater or lesser extent to the conversion of the energy dissipated by said contacting into an acoustic signal. Thus, for example, in the case of a periodic striking contact the acoustic element could be in the form of a generally bell-shaped member with one or more axially extending projections constituting said engaging portion(s).

It will be understood that bearings in normal use will cause a certain amount of background noise (which may be acoustic in nature and/or in the form of periodic mechanical strain), however, in accordance with the present invention a failed bearing will produce a distinctive warning signal in a generally stepwise increment above any background noise and which thus may be readily detected.

Thus with an alarm system of the present invention a distinctive alarm signal may be generated in a particularly simple, effective, and economic manner upon overheating of a bearing in use of the system so that said overheating bearing may be readily detected and replaced thereby minimising the risk of fire etc. from continued overheating. Moreover by using a generally axially operating configuration of the alarm, the acoustic element may be more or less readily disposed at a substantially external portion of the rotary bearing installation thereby maximising transmission of the acoustic alarm signal to the surrounding area and thereby maximising the ease and speed of detection thereof. Nevertheless if desired additional audio transmission, modulation, amplification and/or relay means may be used in order, still further to enhance the attention—attracting quality of the acoustic alarm signal generated directly by said contact. A further significant advantage of the axially operating configuration and substantially external mounting it permits, is that this considerably facilitates the application of the present invention to existing rotary bearing installations i.e. so-called retrofitting as will be further explained hereinbelow.

Thus in a further aspect the present invention provides an alarm signal generator means suitable for use in an alarm system of the invention, which alarm signal generator means comprises a thermally activated engagement element formed and arranged so as to be driven upon reaching a predetermined elevated temperature from a first primed retracted position into a second deployed extended alarm position, and having an engagement element support means formed and arranged for mounting of said element to said first bearing portion or body connected thereto in use of the signal generator means so that said engagement element is displaceable from its retracted to its extended position, generally axially of the rotatable bearing, and said support means therefor is restrained against displacement in the opposite direction, said alarm signal generator means also including an engaging portion having an engaging portion support means formed and arranged for supporting said engaging portion on a said second bearing portion or body connected thereto in use of the signal generator means, for positive contacting by the engagement element in its extended position.

It should also be understood that the present invention may be employed with any form of rotary bearing from integrally formed bearing means which simply comprise complementary male and female cylindrical surface portions of two relatively rotating bodies such as a cylindrical shaft and a plain annular wheel or roller mounted directly thereon, to discrete rotary bearing systems formed and arranged for mounting between two bodies which are required to be relatively rotatable. Accordingly each of the alarm components may be mounted on a said body or on a respective discrete bearing component mounted thereto.

Further preferred features and advantages of the present invention will appear from the following detailed description given by way of example of some preferred embodiments illustrated with reference to the accompanying drawings in which.

Figure 1:
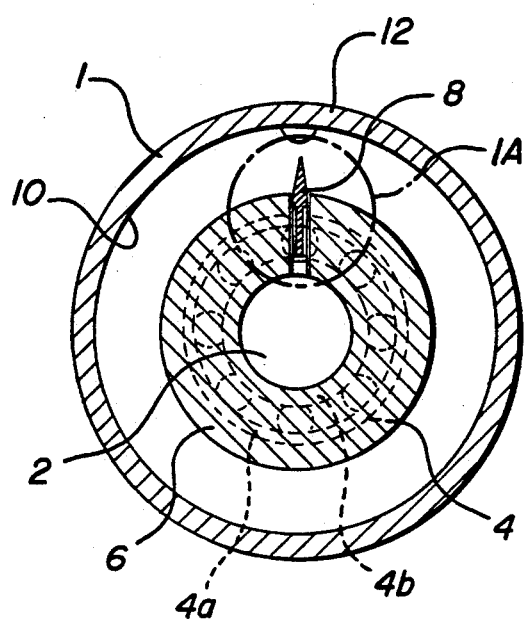
FIG. 1 is a cross section through an idler roller.
Figure 1A:
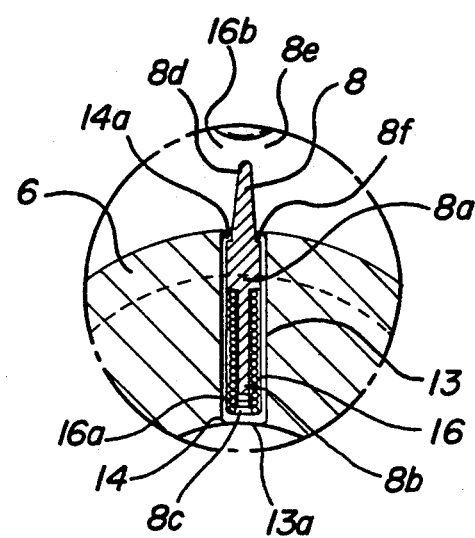
FIG. 1A shows a first embodiment of the bearing alarm system of the invention.

FIG. 1 shows a rotary mechanism in the form of a driveless idler roller generally indicated by reference number 1 such as is used to support the moving belt (not shown) of a belt conveyor. The roller 1 is rotatably mounted on a fixed shaft 2 by rotary bearings 4 having first and second bearing portions 4a, 4b (shown in dashed line). Adjacent the bearing 4 and also mounted on the fixed shaft 2 is a mounting plate 6 which supports a thermally activated engagement element 8 in the form of a pin having a short generally cylindrical body 8a with an elongate spindle 8b at one end 8c and a flexible tapering end portion 8d at its other end 8e which end portion 8d projects outwardly of the borehole 13 and has a maximum diameter slightly less than that of the body 8a so as to form a shoulder 8f at said other end 8e of the body 8a. The engagement element 8 is mounted in close proximity to the bearing 4 so as to be in thermal connection therewith. An internal side wall 10 of the roller 1 has an engagable portion in the form of a protrusion 12 extending radially inwardly front the roller 1.

Under the normal operating conditions of the roller 1, the engagement element 8 is retained in a borehole 13 in the mounting plate 6 by a retaining clip 14 (See inset). In more detail the retaining clip 14 is generally "C"-shaped with opposed free end portions forming jaws 14a which engage the shoulder 8f at opposite sides f the pin 8 to hold the body 8a in the borehole 13. The spindle 8b of the pin 8 has disposed concentrically therearound a memory coil spring 16 having one end 16a engaging spring clip 14 at the base 13a of the borehole 13, and its other end 16b against said one end 8c of the pin body 8a. Should the bearing 4 start to fail, heat is generated which is transferred to the engagement element 8. The memory spring 16 is formed and arranged so as to extend to its original size when an elevated temperature indicative of likely bearing failure and/or a likely fire hazard in the immediate environment, is reached. As the spring 16 extends it forces apart the jaws of the retaining clip, 14 and drives the engagement element 8 partially out of the stationary plate 6 into contact with the internal side wall 10 of the rotating roller 1 and the protrusion 12, which strikes the engagement element 8 causing an acoustic or audible vibration for detection by detection equipment (not shown) or by operating personnel.

Figure 2:
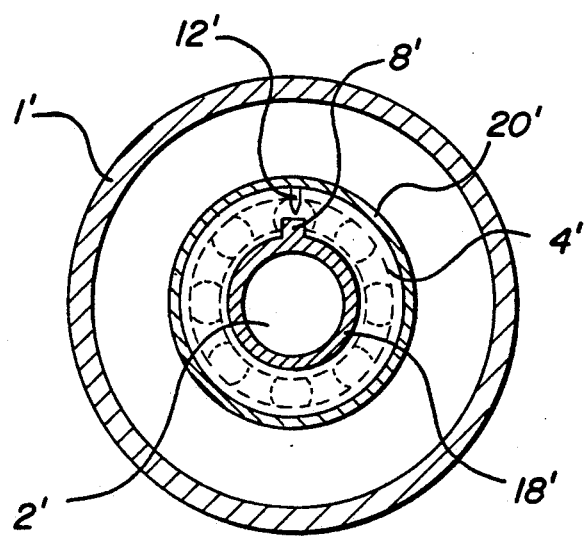
FIG. 2 is similar to FIG. 1 but shows a second embodiment of the alarm system.
Figure 3:
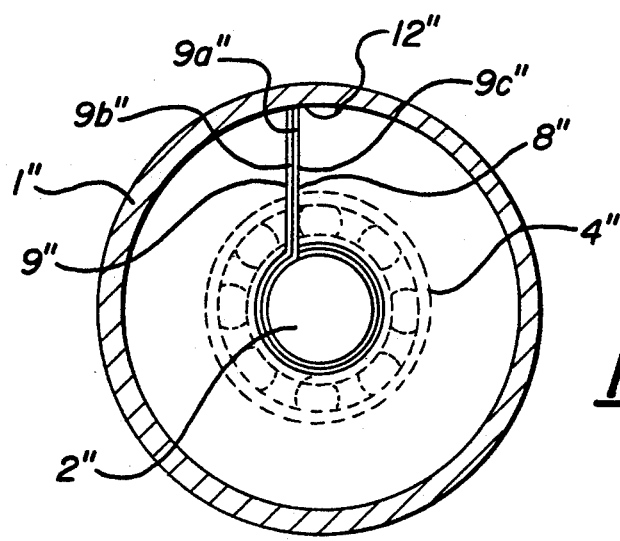
FIG. 3 shows a third embodiment of the invention.
Figure 4A:
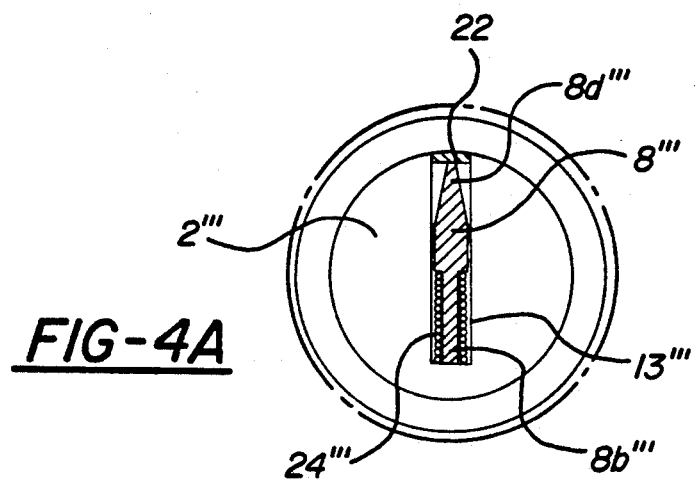
FIG. 4A shows a fourth embodiment of the bearing alarm system of the invention.
Figure 4:
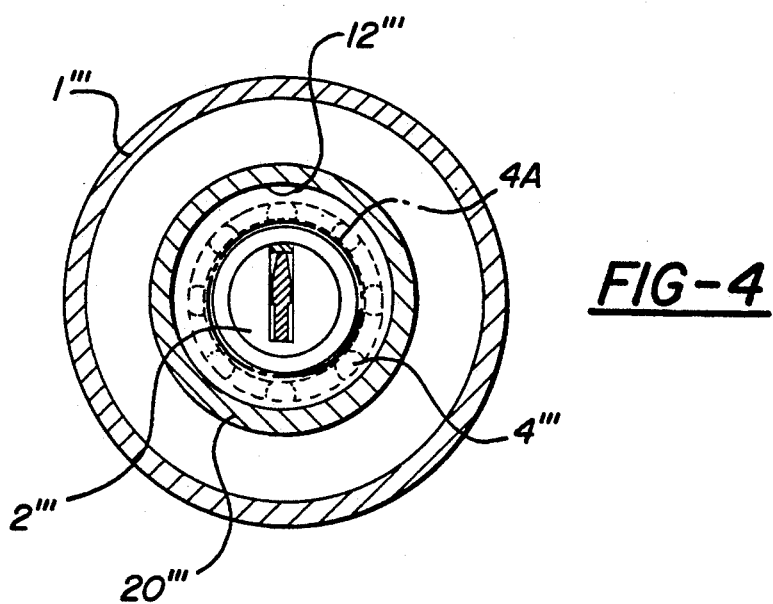
FIG. 4 is a view similar to FIGS. 1-3.

FIGS. 2-4 show alternative forms of the alarm system of the invention and will be described with reference to the embodiment in FIG. 1 and indicated by like reference numbers.

In the embodiment of FIG. 2, the fixed shaft 2 has a memory metal ring 18 attached to it which has an engagement element 8 extending therefrom. The outer rotatable portion 20 of the bearing 4 has a protrusion 12 extending radially inwardly therefrom. In normal working conditions the protrusion 12 and the element 8 do not touch, however should the temperature of the bearings 4 increase above a predetermined value due to failure of the bearing 4, the ring 18 expands so as to bring the engagement element 8 into contact with the rotating protrusion 12 so as to generate an acoustic alarm signal by periodic striking of the engagement element 8 against the protrusion.

In FIG. 3 the engagement element 8 is in the form of a bi-inetallic strip 9 having first and second portions 9a, 9b of first and second materials with different coefficients of expansion, attached to the fixed shaft 2 which when overheated above a predetermined value straightens so as to expand in a radially outward direction into contact with said protrusion 12 thereby causing noise and vibration which may be detected by suitable equipment or operating personnel.

FIG. 4 shows another embodiment of the system wherein the outer part 20 of the bearing 4 has an engagement portion in the form of an inwardly projecting protrusion 12. The engagement element 8 is generally similar to that in the embodiment of FIG. 1 and is mounted inside a generally diametrically extending borehole 13 in the fixed shaft 2 (see inset) and is sealed therein by a fusible metal alloy plug 22. Should the bearing 4 fail and start to overheat, the fusible plug 22, will at a predetermined temperature melt and the engagement element 8 be forced out into contact with the rotating protrusion 12 by a helical spring 24 disposed around the spindle 8b of the engagement element 8 similarly to the arrangement in FIG. 1 albeit in this case the biasing force exerted by the spring 24 will be generally constant during operation of the system. As the bearing rotates the projecting tapering end portion 8d periodically strikes the protrusion so as to generate a noise and vibration that may be detected.

Figure 5:
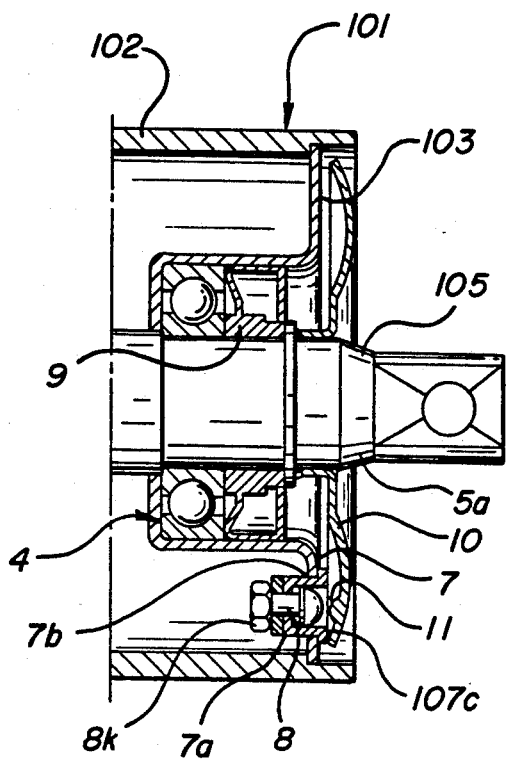
FIG. 5 is a cross section through one end of a conveyor idler roller showing a fifth embodiment of the bearing alarm system of the invention.

FIG. 5 shows a rotary mechanism in the form of a driveless idler roller generally indicated by reference number 1 such as is used to support the moving belt (not shown) of a belt conveyor. The roller 1 comprises a tubular member 2 having a stepped annular end support 3 rotatably mounted via rotary bearings 4 on a fixed shaft 5. At an axially and radially outer portion 7 of the support 3 is mounted a thermally activated engagement element 8 in the form of a pin having a short generally cylindrical body 8a (see FIG. 5A) with an elongate spindle 8b at one end 8c and a generally hemispherical head portion 8d at its other end 8e which end portion 8d is disposed outwardly of a tubular casing 8f. Axially inwardly of the hemispherical head portion 8d is the Cylindrical body 8a which is separated from the head portion 8d by an annular groove 8h so as to form a shoulder 8i on said cylindrical body 8a for engagement with a lip 8j at the mouth of said casing 8f so as to yieldably retain the cylindrical body 8a within said casing 8f in the primed condition of the element 8. The engagement element 8 is mounted so as to be in relatively good thermal connection with the bearing 4 through the support 3. In more detail it may be seen that the element 8 is secured with the end of a unit 8k in a small metal cup 7a which is a push fit inside an aperture 7b in the axially outer portion 7 of the support 3 which facilitates retro-fitting of the alarm signal generator means i.e. the later application thereof to an existing convenient roller installation insofar as the unit 8k can be simply push-fit inserted into an aperture 7b drilled or otherwise formed in the axially outer support portion 7 of the support 3.

Immediately axially outwardly of the bearing 4 is mounted an annular seal 9 of a suitable natural or synthetic polymer (e.g. a rubber or polyalkene) for protecting the bearing 4 against the ingress of contaminants. Axially beyond the seal 9 is mounted on the shaft 5 an acoustic element in the form of an annular, partly dished or belled, plate 10 which has an axially inwardly extending dimple projection 11. (see also FIG. 6). Again this plate 10 can be simply retro-fitted by push-fit mounting over the end 5a of the roller shaft 5.

Under the normal operating conditions of the roller 1, the engagement element 8 is retained in its primed retracted position with the cylindrical portion 8a inside the casing 8f. The spindle 8b of the pin 8 has disposed concentrically therearound a memory coil spring 16 leaving one end 16a engaging the base 8l of the casing 8f, arid its other end 16b against said one end 8c of the pin body 8a. Should the bearing 4 start to fail heat is generated which is transferred through the support 3 to the cup 7a and thence to the engagement element 8 mounted inside it. The memory spring 16 is formed and arranged so as to extend to its original size when an elevated temperature indicative of likely bearing failure and/or a likely fire hazard in the immediate environment, is reached. As the spring 16 extends and drives the engagement element cylindrical body shoulder 8i against the lip 8i of the casing 8f splaying it open and pushing the element head portion 8d out of the cup 7a into contact with the dimple projection 11, to strike it once each revolution thereby causing a distinct acoustic signal which may be readily heard by any operating personnel in the vicinity. As may be seen in FIG. 5, the cup 7a has an outwardly turned lip 7c which engages the support portion 7 around the aperture 7b at its axially outer side 7d thereby to restrain the cup 7a against being forced through the aperture 7b when the head 8 of the engagement element 8 strikes the dimple projection 11 on the acoustic plate 10.

It will be appreciated that the somewhat bell-shaped form of the acoustic plate helps to maximise the amplitude of the sound generated by the striking thereof with the engagement element head portion 8d. Furthermore the position of the acoustic plate 10 at the axially outer end 5a of the shaft 5 and outside the enclosed interior of the roller 1 helps to avoid loss of the sound through its being muffled inside the roller and any belt supported thereby in use of the roller, and thus helps to maximise the sound transmitted to the surrounding area arid hence the ease and speed of detection of an alarm condition by any passing personnel.

Figure 7:
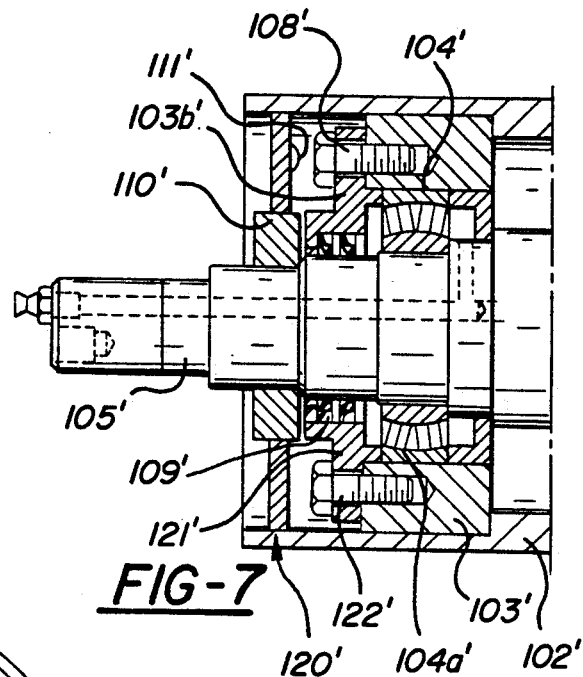
FIG. 7 is a view similar to FIG. 5 of a conveyor drum with a sixth embodiment of the invention.
Figure 6:
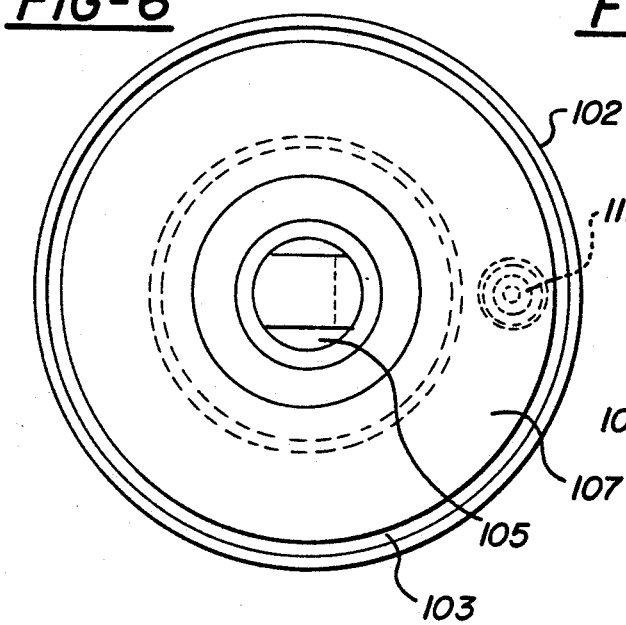
FIG. 6 is an end elevation of the roller of FIG. 5.

FIG. 7 shows a generally similar form of the alarm system of the invention applied to a return roller or drum 20 for an endless conveyor belt installation and like parts corresponding to those in FIGS. 5 and 6 are indicated by like reference numbers. It will be noted that in this case the support 3 between the tubular member 2 of the drum 20 and the radially outer bearing portion 4a, has secured thereto a sealing collar 21 for mounting of flexible annular seals 9 around the shaft 5 so as to prevent ingress of foreign matter to the bearing 4. The sealing collar 21 is secured to the support 3 by means of a plurality of bolts 22 one of which is conveniently replaced by a thermally actuated element 8 whose head is driven axially outwardly towards an acoustic plate 10 (not dished in this case) upon thermal actuation for periodic contacting with an opposed boss projection 11.

Figure 5A:
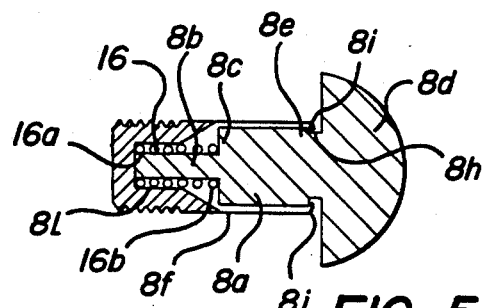
FIG. 5A is a detail view of the thermally actuated engagement element of FIG. 5 and part of its mounting, on an enlarged scale.
Figure 8:
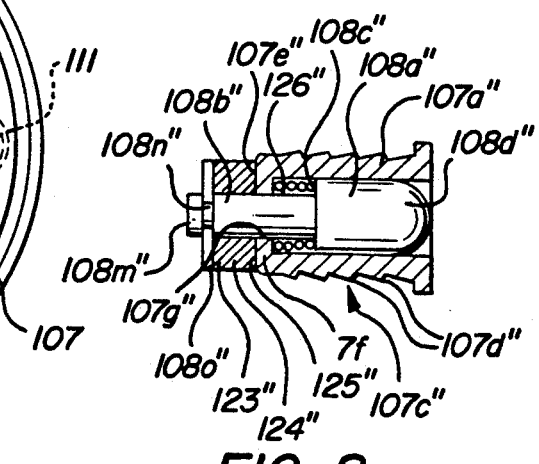
FIG. 8 is a view corresponding to that of FIG. 5A showing another form of thermally actuated element of an alarm signal generator means of the invention.

FIG. 8 is a detail sectional view corresponding to that of FIG. 5A of another form of thermally activated element in which like parts corresponding generally to those of FIG. 5A are indicated by like reference indicia. In this case the outside face 7c of the cup member 7a has a plurality of frusto-conical ring formations 7d forming a serrated surface which facilitates force fitting of the cup 7a in the aperture 7b in the end support 3 of the roller 1 whilst resisting withdrawal therefrom. The distal end 8m of the elongate spindle 8b has an annular groove 8n which is engaged by a retaining circlip 8o which abuts one end 23 of an annular spacer 24 whose other end 25 abuts the outside 7e of the cup base 7f, which has a central aperture 7g through which extends the pin spindle 8b. A compression spring 26 is disposed around the pin spindle 8b for acting between the one end 8c of the main body 8a of the pin and the base 7f of the cup 7a, so as to tend to urge the head 8c of the main pin body 8a outwardly of the cup 7a.

The annular spacer 24 is made of a low melting point (e.g. 80° C.) alley so that when the bearing overheats the spacer 24 melts and is displaced from between the refraining circlip 8o and the cup base 7f allowing the former to approach the latter as the pin body 8a is driven away from the cup base 7f by the expanding compression spring 26.

It will of course be appreciated that various different forms of thermally activated engagement element may also be used in the various embodiments. Moreover in the case of critical and/or larger components especially such as an end drum for a conveyor run, two or more engagement elements formed and arranged for activation at different, progressively higher, temperatures may be employed in order to signal different levels of overheating e.g. corresponding to early warning and imminent danger conditions.

What is claimed is:

1. An alarm system suitable for use in warning of overheating in a rotatable bearing including first and second bearing portions mounted for relative rotation therebetween, said alarm system comprising:
    an alarm signal generator having a thermally activated engagement element in mechanical communication with one of said first and second bearing portions and in thermal connection therewith, said engagement element capable of movement from a first primed retracted position into a second deployed extended alarm position; and
    an engaging portion in mechanical communication with the other of said first and second bearing portions, said engagement element being operable, upon reaching a predetermined elevated temperature, to move from said first retracted position to said second extended alarm position to make an at least intermittent contact with said engaging portion during relative rotation between said first and second bearing portions without substantially impeding continuing relative rotation therebetween and produce from said contact a distinctive alarm signal which coextends in time with said relative rotation of said bearing portions, thereby indicating that said bearing has exceeded said predetermined temperature.

2. The alarm system of claim 1 wherein said thermally activated engagement element further includes resilient biasing means to urge the engagement element from said primed position towards said alarm position.

3. The alarm system of claim 2 wherein said thermally activated engagement element further includes a thermally activated, fusible element to retain said engagement element in said primed position, said fusible element being fusible at said predetermined elevated temperature to release said engagement element into said alarm position.

4. The alarm system of claim 3 wherein said engaging portion further includes a generally radially extending projection, and said engagement element further includes a pin mounted in a borehole formed in said element attached thereto and by means of a fusible link, and a resilient biasing means including an axially compressible spring disposed in the borehole to urge the pin in a direction radially outboard of the borehole, said pin having a flexible distal end portion, wherein, upon release of the pin by fusing of the fusible link, said flexible distal end portion of the pin projects outwardly of the borehole for periodic striking engagement with said engaging portion to produce said distinctive alarm signal.

5. The alarm system of claim 2 wherein said thermally activated engagement element further includes a latch formed of a material having shape memory characteristics for retaining said engagement element in said primed position, said latch being further operative to change its shape at said predetermined elevated temperature so as to release the element into said alarm position.

6. The alarm system of claim 2 wherein said thermally activated engagement element further comprises a thermal activation element formed of a material having shape memory characteristics and operative to retain said engagement element in said primed position, and change shape at said predetermined elevated temperature so as to displace the engagement element to its alarm position.

7. The alarm system of claim 1 wherein said thermally activated engagement element comprises a thermally variable configuration member having a first configuration at a normal bearing operating temperature, and a second, significantly different, configuration at and above said predetermined elevated temperature, said variable configuration member having a distal portion which is spaced from the engaging portion in said first configuration, and positively contacts said engaging portion in said second configuration.

8. The alarm system of claim 7 wherein said thermally variable configuration member has a first portion formed of a material having a first coefficient of expansion joined to a second portion formed of a second material having a second, different, coefficient of expansion so that said member changes from said first configuration to said second configuration when the temperature of the member traverses said predetermined elevated temperature.

9. The alarm system of claim 8 wherein said thermally variable configuration member is a bimetallic strip.

10. The alarm system of claim 7 wherein said thermally variable configuration member is formed of a material having configurational memory characteristics.

11. The alarm system of claim 10 wherein said thermally activated engagement element formed is of a plastic material having shape memory characteristics.

12. The alarm system of claim 1 wherein said engaging portion is configured as an at least partially circumferentially extending surface which frictionally contacts said engagement element to produce a distinctive screeching sound.

13. The alarm system of claim 1 wherein said thermally activated engagement element further comprises a thermally variable configuration member, said thermally variable configuration member having a first configuration at a normal bearing operating temperature, and a second, significantly different, configuration at and above said predetermined elevated temperature, and including a distal portion for contact with the engaging portion, whereby said thermally variable configuration member is spaced from the engaging portion in said first configuration, and said distal portion of said thermally variable configuration member positively contacts said engaging portion in said second configuration.

14. The alarm system of claim 13 wherein said thermally variable configuration engagement member is formed of a material having configurational memory characterization.

15. The alarm system of claim 14 wherein said thermally activated engagement member is of a plastic material having shape memory characteristics.

16. The alarm system of claim 1 wherein said engagement element is mounted for displacement between its retracted and extended positions generally axially of said rotatable bearing.

17. The alarm system of claim 16 wherein at least one of said engagement element and said engaging portion has an acoustic element disposed at a substantially external portion of the bearing so as to transmit a substantial acoustic distinctive alarm signal to the exterior of the bearing.

18. The alarm system of claim 17 wherein said acoustic element comprises a generally bell-shaped member with at least one axially extending projection constituting said engaging portion.

19. The alarm system of claim 18 wherein said thermally activated engagement element further includes resilient biasing means to urge the engagement element from said primed position towards said alarm position.

20. The alarm system of claim 19 wherein said thermally activated engagement element further includes a thermally activated, fusible element to retain said engagement element in said primed position, said fusible element being fusible at said predetermined elevated temperature to release said engagement element into said alarm position.

21. The alarm system of claim 18 wherein said thermally activated engagement element comprises a thermally variable configuration member having a first configuration at a normal bearing operating temperature, and a second, significantly different, configuration at and above said predetermined elevated temperature, said variable configuration member having a distal portion which is spaced from the engaging portion in said first configuration, and positively contacts said engaging portion in said second configuration.

22. The alarm system of claim 1 further comprising alarm signal detection means, transmission means, and at least one of amplification means and electronic relay means.

23. The alarm system of claim 1 wherein the alarm signal generator further includes an engagement element support means to mount said element to said first bearing portion so that said engagement element is displaceable from its retracted to its extended position generally axially of the rotatable bearing, and said support means is retained against displacement in the opposite direction, said alarm signal generator also further including an engaging portion support means for supporting said engaging portion on said second bearing portion such that said engaging portion is positively contacted by the engagement element in its extended position.

24. The alarm system of claim 1 wherein said engaging portion is configured as at least one generally radially extending projection which is periodically stuck by the thermally activated engagement element in said extended position as the bearing portions rotate relative to one another so as to produce said distinctive alarm signal.

25. The alarm system of claim 24 wherein at least one of said engagement element and said projection is resiliently deflectable upon striking therebetween so as to reduce wear thereof.

26. An alarm system suitable for use in warning of overheating in a rotatable bearing including first and second bearing portions mounted for relative rotation therebetween, said alarm system comprising:
- an alarm signal generator having a thermally activated engagement element in thermal connection with at least one of said first and second bearing portions, said engagement element capable of movement from a first primed retracted position into a second deployed extended alarm portion; and
- an engaging portion mounted for relative rotation with respect to said engagement element, said engagement element being operable, upon reaching a predetermined elevated temperature, to move from said first retracted position to said second extended alarm position to make an at least intermittent contact with said engaging portion during relative rotation between said first and second bearing portions without substantially impeding continuing relative rotation therebetween and produce from said contact a prolonged distinctive alarm signal, thereby indicating that said bearing has exceeded said predetermined temperature.

* * * * *